(12) United States Patent
Jakobsson

(10) Patent No.: US 12,073,440 B2
(45) Date of Patent: *Aug. 27, 2024

(54) ADVERTISING MODEL

(71) Applicant: Security Technology, LLC, New York, NY (US)

(72) Inventor: Bjorn Markus Jakobsson, New York, NY (US)

(73) Assignee: Security Technology, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/240,812

(22) Filed: Aug. 31, 2023

(65) Prior Publication Data

US 2024/0212000 A1    Jun. 27, 2024

Related U.S. Application Data

(63) Continuation of application No. 18/087,244, filed on Dec. 22, 2022, now Pat. No. 11,783,376, which is a continuation of application No. 17/201,306, filed on Mar. 15, 2021, now Pat. No. 11,562,402, which is a continuation of application No. 16/538,463, filed on Aug. 12, 2019, now Pat. No. 10,977,696, which is a continuation of application No. 13/682,634, filed on Nov. 20, 2012, now Pat. No. 10,438,246.

(60) Provisional application No. 61/562,235, filed on Nov. 21, 2011.

(51) Int. Cl.
     *G06Q 30/0273*    (2023.01)
(52) U.S. Cl.
     CPC .............................. *G06Q 30/0273* (2013.01)

(58) Field of Classification Search
     CPC .................................................. G06Q 30/0273
     See application file for complete search history.

(56) References Cited

U.S. PATENT DOCUMENTS

| | | | |
|---|---|---|---|
| 7,580,926 B2 | 8/2009 | Kapur | |
| 7,672,937 B2 | 3/2010 | Madhavan | |
| 7,698,331 B2 | 4/2010 | Carson, Jr. | |
| 7,809,740 B2 | 10/2010 | Chung | |
| 7,941,383 B2 * | 5/2011 | Heck | G06F 16/954 706/21 |
| 7,949,562 B2 | 5/2011 | Collins | |
| 7,966,564 B2 | 6/2011 | Catlin | |
| 8,103,650 B1 | 1/2012 | Kauchak | |
| 8,271,413 B2 | 9/2012 | Agarwal | |
| 8,296,176 B1 | 10/2012 | Chatwin | |

(Continued)

OTHER PUBLICATIONS

Jung, 2017, pp. 2-118.*

(Continued)

*Primary Examiner* — Michael I Ezewoko
(74) *Attorney, Agent, or Firm* — Van Pelt, Yi & James LLP

(57) ABSTRACT

Tiered advertisement bidding is disclosed. One or more quality metrics associated with a user profile are determined. An advertisement bid is selected from a plurality of tiered bids based at least in part on the determined quality metrics. Determining the quality metrics can include determining a conversion assessment. Determining the quality metric can also include determining whether a need associated with a user profile has been met for a category. In some cases, persona detection is performed with respect to the user profile.

17 Claims, 7 Drawing Sheets

(56) References Cited

U.S. PATENT DOCUMENTS

| | | | |
|---|---|---|---|
| 8,359,238 | B1 | 1/2013 | Kauchak |
| 8,396,737 | B2 * | 3/2013 | Lakshminarayan .. G06F 16/951 |
| | | | 705/7.29 |
| 8,401,899 | B1 | 3/2013 | Kauchak |
| 8,417,573 | B2 | 4/2013 | Slaney |
| 8,423,410 | B2 | 4/2013 | Wang |
| 8,429,184 | B2 | 4/2013 | Ismalon |
| 8,473,500 | B2 | 6/2013 | Baluja |
| 8,554,629 | B2 | 10/2013 | Barton |
| 8,572,011 | B1 | 10/2013 | Sculley, II |
| 8,577,726 | B1 | 11/2013 | Betz |
| 8,626,575 | B1 | 1/2014 | Gong |
| 8,706,546 | B2 | 4/2014 | Anderson |
| 8,781,896 | B2 * | 7/2014 | LeBlanc ............ G06Q 30/0255 |
| | | | 705/14.42 |
| 9,159,073 | B2 | 10/2015 | Collins |
| 9,600,568 | B2 | 3/2017 | Rangan |
| 10,049,169 | B2 | 8/2018 | Catlin |
| 2001/0014868 | A1 | 8/2001 | Herz |
| 2006/0069616 | A1 | 3/2006 | Bau |
| 2006/0212350 | A1 | 9/2006 | Ellis |
| 2008/0010144 | A1 | 1/2008 | Chatwin |
| 2008/0103892 | A1 | 5/2008 | Chatwin |
| 2009/0216616 | A1 | 8/2009 | Wang |
| 2009/0282343 | A1 | 11/2009 | Catlin |
| 2010/0211960 | A1 | 8/2010 | Sirajuddin |
| 2011/0078000 | A1 | 3/2011 | Ma |
| 2011/0231246 | A1 | 9/2011 | Bhatia |
| 2012/0059713 | A1 | 3/2012 | Galas |
| 2012/0109956 | A1 * | 5/2012 | Ramaiyer .......... G06Q 30/0277 |
| | | | 707/E17.089 |
| 2013/0124309 | A1 | 5/2013 | Traasdahl |
| 2013/0124329 | A1 | 5/2013 | Tengler |
| 2014/0032665 | A1 | 1/2014 | Weinberg |

OTHER PUBLICATIONS

Britannica Concise Encyclopedia, Encyclopedia Britannica, 2006, p. 537.
Chakrabati, Mining the web, Elsevier, 2003, pp. 81-123, 289-306.
Computing the Mind, Shimon Edelman, Oxford University Press, 2008, pp. 26-31.
HCI remixed: reflections on works that have influenced the HCI community, MIT Press, 2008: pp. 275-279.
Language and Mind, Chomsky, Oxford University Press, 2005, p. 62.
Microsoft Computer Dictionary, Fifth Edition, 2002, Microsoft Press, p. 23.
Mind—A Brief Introduction, John R. Searle, 2004, Oxford University Press, pp. 62-67.
Noetics, Lawrence Krader, 2010, Peter Lang Publishing, pp. 551-553.
Pallotta, Advances in Distributed Agent-Based Retrieval Tools, Springer, 2011, pp. 1-12.
Robotics, Science and Systems III, Wolfram Burgard, Oliver Brock, and Cyrill Stachniss, The MIT Press, 2008, pp. 41-48.
Streetlights and Shadows, MIT Press, 2009, pp. 33-47.
The future of the internet—and how to stop It, Yale University Press, 2008, Chapter(s) 1-9, [emphasis pp. 11-18].
What is Thought, Eric Baum, The MIT Press, 2004, pp. 33-65.
Why a Diagram is (Sometimes) Worth Ten Thousand Words, Larkin, Simon, Cognitive Science, 1987, pp. 65-100.
Ad Tech Daily. Adchemy Launches Platform to Manage Digital Audiences. Oct. 28, 2009.
Berin Szoka. Google's Ad Preference Manager: One Small Step for Google, One Giant Leap for Privacy. Progress Snapshot Release 5.2. Mar. 2009.
Defendants' P.R. 3-3 AND 3-4 Invalidity Contentions and Disclosures. Jan. 29, 2024.
Exhibit 101—402 Patent Defendants' Ineligibility Contentions for U.S. Pat. No. 11,562,402 ("402Patent"). Jan. 29, 2024.
Exhibit B-1—Invalidity Claim Chart for U.S. Pat. No. 11,562,402. Jan. 29, 2024.
Exhibit B-10—Invalidity Claim Chart for U.S. Pat. No. 11,562,402. Jan. 29, 2024.
Exhibit B-11—Invalidity Claim Chart for U.S. Pat. No. 11,562,402. Jan. 29, 2024.
Exhibit B-12—Invalidity Claim Chart for U.S. Pat. No. 11,562,402. Jan. 29, 2024.
Exhibit B-13—Invalidity Claim Chart for U.S. Pat. No. 11,562,402. Jan. 29, 2024.
Exhibit B-14—Invalidity Claim Chart for U.S. Pat. No. 11,562,402. Jan. 29, 2024.
Exhibit B-2—Invalidity Claim Chart for U.S. Pat. No. 11,562,402. Jan. 29, 2024.
Exhibit B-3—Invalidity Claim Chart for U.S. Pat. No. 11,562,402. Jan. 29, 2024.
Exhibit B-4—Invalidity Claim Chart for U.S. Pat. No. 11,562,402. Jan. 29, 2024.
Exhibit B-5—Invalidity Claim Chart for U.S. Pat. No. 11,562,402. Jan. 29, 2024.
Exhibit B-6—Invalidity Claim Chart for U.S. Pat. No. 11,562,402. Jan. 29, 2024.
Exhibit B-7—Invalidity Claim Chart for U.S. Pat. No. 11,562,402. Jan. 29, 2024.
Exhibit B-8—Invalidity Claim Chart for U.S. Pat. No. 11,56. Jan. 29, 2024.
Exhibit B-9—Invalidity Claim Chart for U.S. Pat. No. 11,562,402. Jan. 29, 2024.
Greg Sterling. Yahoo Debuts APT, Its "Unified Digital Advertising Platform". Sep. 24, 2008.
Miguel Helft. Google to Offer Ads Based on Interests. NYTimes.com. Mar. 11, 2009.
The New Yahoo! Ad Platform: APT (Was: AMP, APEX). AdExchanger.com. Sep. 24, 2008.

* cited by examiner

```
Persona-identifier: 1277563

Device identifier: pointers to device records #662888 and #99908.

Access history: pointers to record# 112200I

IP data: pointer to record #220975

Behavioral information: pointer to record #608552

Quality levels: {tag1:pointer to topic #551, 62%, tag2: pointer to topic
#110, 10.5%, tag3: pointer to topic #960}

Demographic information: {gender = (male, 82%), age=(30-25, 68%),
location={(zone31, 22%), (zone778,18%), (zone3,7%)}, interests = {action,
speed, hiking}

Trend ={(temporary lack of interest in tag2: pointer to topic #110 due to
pointer to observation #557781)}
```

FIG. 7

ADVERTISING MODEL

CROSS REFERENCE TO OTHER APPLICATIONS

This application is a continuation of U.S. patent application Ser. No. 18/087,244, entitled ADVERTISING MODEL filed Dec. 22, 2022 which is incorporated herein by reference for all purposes, which is a continuation of U.S. patent application Ser. No. 17/201,306, entitled ADVERTISING MODEL filed Mar. 15, 2021, now U.S. Pat. No. 11,562,402, which is incorporated herein by reference for all purposes, which is a continuation of U.S. patent application Ser. No. 16/538,463, entitled ADVERTISING MODEL filed Aug. 12, 2019, now U.S. Pat. No. 10,977,696, which is incorporated herein by reference for all purposes, which is a continuation of U.S. patent application Ser. No. 13/682,634, entitled ADVERTISING MODEL filed Nov. 20, 2012, now U.S. Pat. No. 10,438,246, which is incorporated herein by reference for all purposes, which claims priority to U.S. Provisional Patent Application No. 61/562,235 entitled ADVERTISING SYSTEM filed Nov. 21, 2011 which is incorporated herein by reference for all purposes.

BACKGROUND OF THE INVENTION

Existing approaches to online advertising typically involve pricing schemes in which multiple advertisers specify an amount of money they are willing to pay per impression (or per click or per other action), and in which an advertisement is selected for display to a user based on which advertiser is willing to pay the most money. Unfortunately, there are inefficiencies in this approach. Accordingly, improvements in advertising models would be desirable.

BRIEF DESCRIPTION OF THE DRAWINGS

Various embodiments of the invention are disclosed in the following detailed description and the accompanying drawings.

FIG. 7 depicts an example of a profile record.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
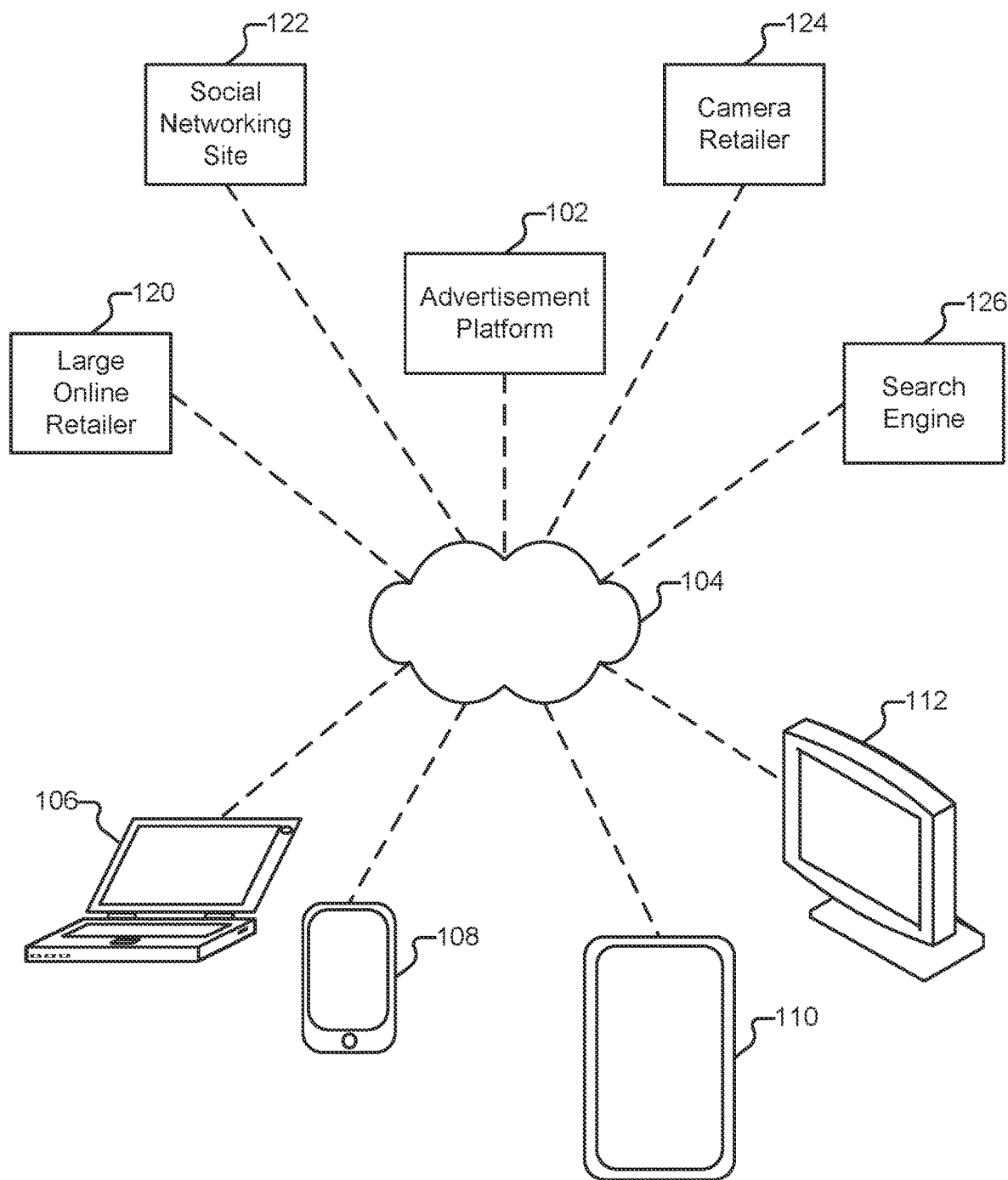
FIG. 1 illustrates an embodiment of an environment in which advertisements are served.

FIG. 1 illustrates an embodiment of an environment in which advertisements are served. In the example shown, client devices 106-112 connect, via one or more networks (represented as a single network cloud 104), to services 120-126 (also referred to herein as "sites") provided by providers. In particular, client device 106 is a notebook computer owned by a user hereinafter referred to as Alice. Client device 108 is a smartphone also owned by Alice. Client device 110 is a tablet owned and used by Bob and sometimes used by Bob's son, Charlie. Client device 112 is a computer terminal located in a library and used by many different individuals (i.e., various library patrons and staff). Service 120 is a shopping website (and, in some embodiments, a set of websites) provided by a multinational online retailer. Service 122 is a social networking site. Service 124 is the online store of a boutique camera retailer that also has a physical store located in New York. Service 126 is a search engine site.

Also included in FIG. 1 is advertisement platform 102, which is configured to facilitate the display of advertisements on client devices 106-112 (e.g., provide ad network services). For example, retailers 120 and 124 can use platform 102 to bid on the placement of advertisements on pages served by search engine site 126 or social networking site 122. Retailer 120 can also use the services of platform 102 to advertise that retailer's products to visitors browsing the retailer's own site (i.e., instead of or in addition to placing advertisements on third party sites such as site 126 or 122). In some embodiments, services (such as services 120 and/or 122) incorporate into their own respective sites at least some of the features described herein as being provided by platform 102, and a separate platform 102 (or at least a portion thereof) is omitted, as applicable.

Platform 102 is illustrated as a single logical device in FIG. 1. In some embodiments, platform 102 comprises standard commercially available server hardware (e.g., a multi-core processor, 4+ Gigabytes of RAM, and one or more Gigabit network interface adapters) and runs typical server-class operating systems (e.g., Linux), and also runs Apache HTTP Server software. Platform 102 can also be implemented using a scalable, elastic architecture and may comprise several distributed components, including components provided by one or more third parties. Further, when platform 102 is referred to herein as performing a task, such as storing data or processing data, it is to be understood that a sub-component or multiple sub-components of platform 102 (whether individually or in cooperation with third party components) may cooperate to perform that task.

Figure 2:
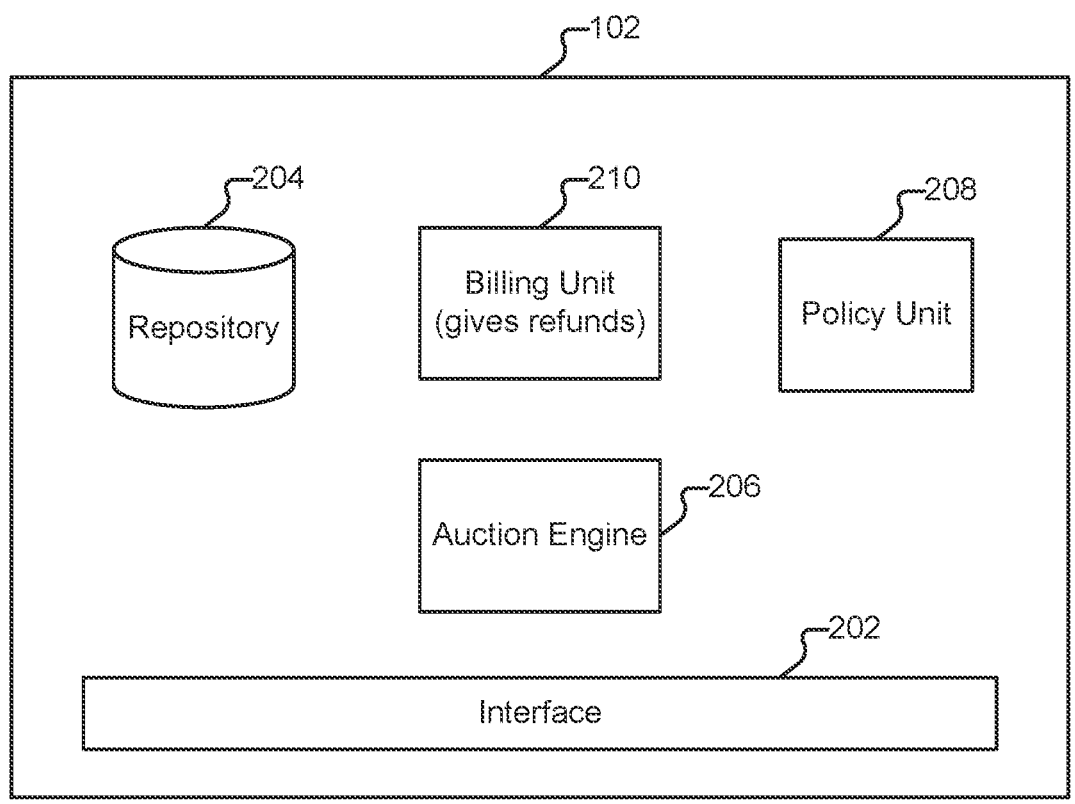
FIG. 2 illustrates an example of components included in embodiments of an advertisement platform.

FIG. 2 illustrates an example of components included in embodiments of an advertisement platform. As will be described in more detail below, entities such as retailer 120 and 124 can use platform 102 to engage in tiered bidding for advertisements (e.g., based on bands of an assessed measure of the quality of the user to whom the advertisement will be shown, if selected). For example, an advertiser can specify that it is willing to pay $0.40 for an advertisement to be shown to a user having a particular assessed value (e.g., a quality score of 70 or better) but is only willing to pay $0.10 if the value is below that. Other aspects of bids can also be defined by the retailer, such as by providing different values for different types of user interactions (e.g., impressions vs. clicks).

In the example shown in FIG. 2, interface 202 is configured to allow entities such as retailers 120 and 124 to upload (or otherwise provide access to) advertisements, specify bid policies, and obtain reporting and other information. Policies are created and managed by policy unit 208 (e.g., based on instructions received via interface 202 from administrators employed by or working on behalf of retailers 120 and 124). Billing unit 210 performs accounting/billing actions, and, as will be described in more detail below, in some embodiments performs discounting (or surcharging) based on techniques described herein.

An auction engine 206 runs advertisement auctions in accordance with policies supplied by policy unit 208 and assessments of user profile information (e.g., one or more user profiles associated with Alice and Bob) stored in repository 204. In some cases, the user profile information will be very detailed and correspond to a single, readily identifiable user. As one example, cookies (or other unique identifiers) stored on notebook 106 can be used to facilitate the capture and storing of detailed information pertaining to Alice on platform 102. In other cases, the user profile information may be less detailed and/or may include information pertaining to multiple individuals or groups of individuals. As one example, it may not be possible to place cookies on tablet 110 or terminal 112. Further, as will be described in more detail below, personae detection techniques can be used to help assess the quality of a prospective recipient of an advertisement where multiple individuals or personae could potentially be interacting with a given device.

Services (such as services 120, 122, and and/or 124) can also augment user profile information stored in platform 102. For example, retailers 120 and 124 can provide the purchase histories of their customers to platform 102, and social networking site 122 can provide information pertaining to its users' likes/dislikes. In some embodiments, the provided data is at least partially anonymized. For example, instead of listing particular book titles purchased by Alice, retailer 120 might provide to platform 102 an indication of the total amount of money she spent on books in a given unit of time.

As will be described in more detail below, advertisement platform 102 supports a tiered billing structure in which an assessed quality (e.g., a conversion assessment of a user profile) is taken into consideration when determining the cost of displaying an advertisement (or for receiving a click or other interaction).

The quality assessment can either be done by a priori, which allows the quality to be an input to an advertisement auction facilitated by platform 102, or as an a posteriori assessment, which could, for example, be expressed as a discount or surcharge on the auction price. In various embodiments, advertisers can particularly bid for traffic of some estimated quality (e.g., by bidding $0.10 per click for a quality at or above 60% and $0.01 for a quality below that). The quality measure is relative to some period of time, which may include a period of time after the display of the advertisement. The quality measure can also be used as an advertiser-specified filter that governs what types of traffic the advertiser is interested in bidding on. The quality measure can also be used for other purposes, such as to determine what landing page to send a user to after a click has been observed; thus, the advertiser can specify different landing pages for different quality measures associated with the user, an associated account or machine, and/or with the click (or other action) in question.

Quality measures can be computed by platform 102 on demand (i.e., in real time) and can also be performed in batch computations (e.g., refreshing the measure nightly to reflect any changes due to recent behavior or a lack thereof). In some embodiments, a generally applicable quality assessment of user profile is performed on a period basis, while quality assessments tailored to the specifications of advertisers are performed in real time. In some embodiments, a quality measure is a multi-dimensional measure that can include any of a variety of individual measures. The following is a summary of three example types of factors that can be considered, in various combinations.

USER ACCOUNT INFORMATION: Examples of user account information include user-provided information (e.g., demographic information supplied directly by the user); observed behavior (e.g., observed by platform 102); and reported behavior (e.g., purchases observed by a third-party provider, such as site 120 and provided to platform 102). Examples of user account information include historical/estimated search and click behavior (and rates), historical/estimated conversions, and historical/estimated purchase volume. Additional examples include other measures such as the age of the account, historical click quality measures, consistency of behavior, and historical/estimated interests.

USER CONTEXT INFORMATION: Examples of user context information include recent searches, mouse-over and click behavior, and information of recent pages requested by the user (whether this information is observed by the network, provided by third parties, or obtained from the user or his/her browser or device). As one example, for a previously viewed advertisement that the user did not click, user context information would include information pertaining to whether the user performed mouse-over actions near the advertisement (e.g., indicating possible interest) or whether the user performed actions suggesting a lack of interest to be exposed to information of this type. The user context information can also include recent purchases and conversions, and/or the believed or known absence of these. Another example of user context information includes any indication that the user is currently in a location or webpage context associated with an increased likelihood of a sale of a type pertinent to an advertisement. For example, if the user is determined to be in an electronics store while viewing a page describing a particular router, then an advertiser wishing to sell routers would be willing to pay more for the advertisement slot than in another situation.

GENERAL CONTEXT INFORMATION: One example of general context information includes user context information of other users, such as the activities of other users with whom the user has a connection. Examples of connections include whether the user and other user(s) are "friends" on site 122; have both used a device having the same IP address; belong to the same demographic group; and/or share past behaviors including clicks, conversions or purchases. Another example of general context information includes temporal information, such as estimates of how likely the desired behavior is at the current time of the day, the day of the week, or the day of the month. Further, the quality measure can include estimates of how much time a person typically spends comparison shopping before making a decision, and the amount of comparison shopping that the network knows has taken place within a particular area of interest. Additional examples of general context information include information about the available types of advertisements and/or profiles of advertisers, each one of which will generate one quality measure associated with the user and his or her context.

Determining Whether a Need has been Met

In some embodiments, advertising platform 102 is configured to determine when a need has been met. One example of a need being identified as having been met is as follows. Suppose a user is interested in buying a camera and performs searches for terms such as "buy camera" and "camera review" with search engine 126. In some embodiments, the user's searches of search engine 126 are stored by platform 102 in a user profile associated with the user. Such searches may also be classified, summarized, or stored with classifications/summarizations. For example, searches such as "buy camera" and "camera review" might be stored (simplified) as: "Shopping+Electronics" or "Shopping+Camera." A variety of other techniques can be used to infer user interest (in addition to or instead of search term observation), including the use of conversion information, click-through rate, and access to webpages of relevance.

Suppose that at some point in the future, platform 102 receives an indication that the same user is interested in buying a lens cap for a camera or a photo album. While such a search does not mean with certainty that the user purchased a camera, it is likely that the user purchased a camera, and thus the user's "need" for a camera was met. Whether the user's need has been met can be used as another dimension of a quality measure, for example relative to a particular product type, or type of recent activity of the user, or of users associated with the user in question.

Another example of the determination of needs being met is as follows. Suppose a user is observed to be interested in purchasing beginner's books on painting (e.g., by retailer 120), and later, the user purchases paint brushes. It is likely that the user is no longer interested obtaining beginner books on painting (because that particular need has been met). However, it is also likely that the user will be interested in purchasing paint. In this example, one action (e.g., purchase or search) can be indicative of an old need or interest being less likely now, and also of a new interest being likely.

Figure 3:
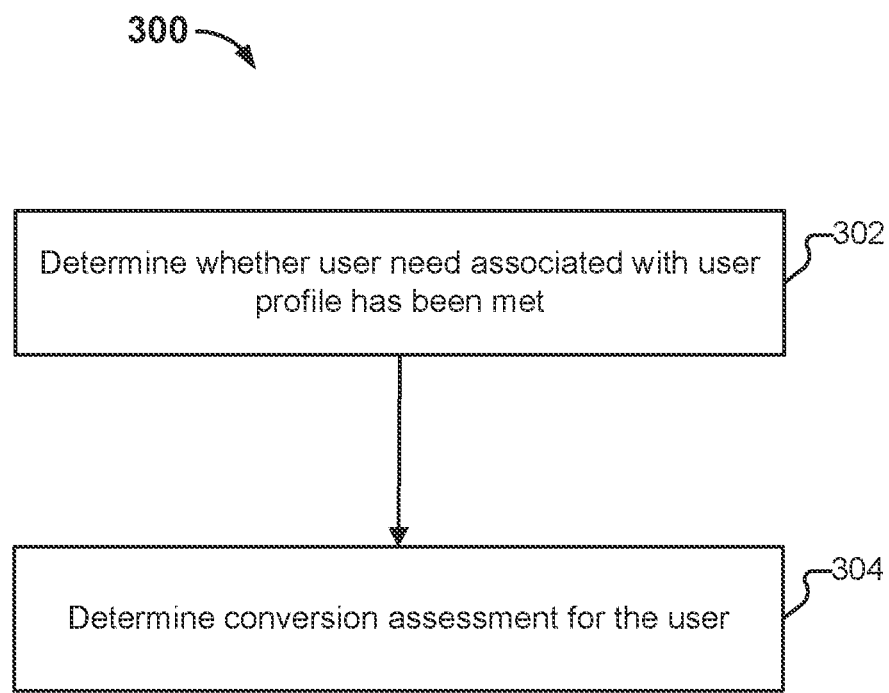
FIG. 3 illustrates an embodiment of a process for performing a conversion assessment for a user.

FIG. 3 illustrates an embodiment of a process for performing a conversion assessment for a user. In some embodiments, process 300 is performed by platform 102. The process begins at 302 when a determination is made as to whether a need associated with a user profile has been met for a category. As one example, suppose a user has spent quite a bit of time researching washers and dryers over the last week (i.e., indicating a need in the category of "Large Appliances"). The user has stopped performing such research and is instead now researching installation companies. At 302, a determination would be made that a need that was previously associated with the user profile has been met. As another example, where a user previously researched travel to Spain and suddenly switched to researching travel to France, a determination could be made at 302 that a "Travel" or "Vacation" need previously associated with the user's profile has not yet been met.

The process ends at 304, when a conversion assessment is determined for the user based at least in part on the determination of whether the need has been met. In the case of the large appliances, at 304, it would be determined by platform 102 that advertisements involving large appliances will likely have a very low conversion rate if presented to the user. Other advertisements (e.g., pertaining to home warranties, fix-it classes, etc.) may be determined to have very high conversion rates. Or, it may be determined that an entirely different category of advertisement (e.g., one pertaining to dog food) would likely result in higher profit than showing the user any home improvement advertisements. In the case of the user researching travel, the conversion assessment would likely reveal that advertisements pertaining to travel will have a reasonably high conversion rate, because the user's "need" in the travel category has not yet been met.

EXAMPLE AUCTION OUTCOMES

The following two examples illustrate how multi-tiered bidding techniques can be used in advertisement auctions.

Example 1: A Comparison of Four Prospective Advertising Targets

Suppose repository 204 includes user profile information associated with a total of four unique users: Dave, Eve, Frank, and Georgia.

Dave likes horses and also spends a lot of money online. His conversion rate is high, in particular at night, when he is also doing most of his shopping. He often buys the same items over and over, e.g., products and services that expire or are used up.

Eve likes rats and sports, and is thrifty. Most of her purchases are small. Her conversion rate is low, and she does a lot of comparison shopping before making a decision.

Frank has a lot of interests, a high conversion rate, but is thrifty.

Georgia's profile in repository 204 was recently created and little is known about her.

Dave is the most attractive user to target, in general, and is especially attractive to an advertiser whose products or services relate to horses. Since his conversion rate is higher at night than during the day, there is a premium associated with any night-time advertisement displayed to Dave. Having already bought a product is no clear indication that Dave is not interested in buying the same product again, so the quality measure associated with his actions are not strongly dependent on recent conversions.

Eve is a reasonably attractive user to a retailer selling products or services relating to rats and sports. There is a premium associated with clicks initiated by Eve after she has done a threshold amount of comparison shopping within one particular area of interest (e.g., ping pong paddles) within a window of time; in some embodiments this premium is a constantly increasing multiplier. However, if there is reason to believe that Eve performed the associated purchase at some point, her associated quality score will be dramatically reduced.

Frank is a reasonably attractive user to advertisers of products that are not typically sold online, but who are keen on educating consumers about the benefits of their products. Since Frank has a high conversion rate, this results in a premium worth paying for by such advertisers. However, advertisers whose main goal of a conversion is an immediate sale may not be interested in paying this premium. Since the system will identify Frank as a person with a high conversion rate but low known online-purchase rate, these advertisers will not be interested in placing high bids to reach Frank. If at some point it becomes known—potentially from Frank's demographic information (e.g., inferred from his online activities)—that Frank belongs to a demographic group of users that is preferred by one type of advertiser (e.g., insurance seller or car manufacturer) then this information can be included as an input in the auction, allowing these advertisers to identify that Frank's attention is particularly valuable.

Georgia is virtually an unknown. As a result, no advertisers may be interested in paying a premium for reaching her with an advertisement. As a result, the bids to display advertisements to Georgia will be low and are likely to be won by advertisers with low budgets and rather untargeted campaigns. As one example, advertisers may be unwilling to target Georgia with clickable advertisements and prefer instead to show her only impressions.

If tiered bidding was not employed (e.g., by auction engine 206), displaying an advertisement to any of the four individuals (Dave, Eve, Frank, and Georgia) might cost a given advertiser (e.g., of sports cars) the same amount (e.g., $0.10), irrespective of whether that advertisement is shown to Dave or to Georgia. In contrast, where auction engine 206 supports tiered bidding, a given advertiser might be charged $1 to display an ad to Dave; somewhere between $0.09 and $0.20 for display to Eve (depending, e.g., on her past activity related to the keyword under consideration); $0.10 to display to Frank (assuming that the advertiser is aiming to educate consumers); and a mere $0.01 to display to Georgia.

An advertiser that buys the ability to display an advertisement to Dave will pay more in the described tiered bidding system than in an existing system. However, the advertiser is willing to incur the extra cost to increase the quality of the person to whom the advertisement is shown (as expressed by its willingness to pay more). The same is true in the case of Eve. Frank's impressions are sold to advertisers who care about users like Frank. Other advertisers can avoid paying for his impressions, which is beneficial to them. Finally, budget-minded advertisers will have an opportunity to reach consumers like Georgia at a considerable savings over what they would pay in a system without tiered bidding. Other advertisers can avoid having to pay for traffic of unknown quality. As Georgia's profile is expanded (e.g., as a result both of her regular online actions, and her click behavior on advertisements she is shown), she will become more valuable to some advertisers, and the price for her traffic may increase. If it turns out that Georgia's traffic is not valuable to any advertiser in particular, then her clicks will stay priced very low. Further, it may be the case that Georgia is not in fact a person, but rather, a bot or other traffic source with no or very little quality. The tiered bidding techniques described herein will cause less money to be wasted by advertisers on such low quality traffic than in a system that does not provide tiered bidding. In some embodiments, such as where it is not clear whether a given user profile represents one or more human entities or is instead a bot, an auction to display an ad nonetheless takes place. If it is subsequently determined that the user is a bot, the advertiser can be refunded or credited any fees incurred based on the assumption that the user was human.

Example 2: Multi-Dimensional Bidding

Suppose three advertisers would like to have their advertisements placed (e.g., on site 122) by advertisement platform 102.

Advertiser 1 wishes to only bid on traffic with quality level 5 or higher, out of 10. It will pay $0.40 for a click of level 5, $0.50 for a click of level 6-8, and $0.75 for a click of level 9 or 10. The quality measures it considers are general, and not specific to any particular type of product.

Advertiser 2 is willing to bid for any traffic. It will pay $0.05 per click quality level, i.e., $0.05 for a click with quality level 1, $0.10 for a click with quality level 2, $0.15 for a click with quality level 3, etc. All the levels are for the merchandise sold by advertiser 2, i.e., not the general levels. It is only interested in traffic from users who performed an online purchase in the past ten days. It will pay an extra $0.05 for any click where it is known that the user has an existing checkout account (e.g., Google Checkout), and yet another $0.10 if it is known that the user in question has used such a payment method in the past month.

Advertiser 3 wishes to only bid on traffic from users who click on advertisements at least once a week, but no more than three times a day, during the last two-month period. It will pay at most $0.03 times the respective user's quality measure for users interested in camera equipment, and at most $0.01 times the respective user's quality measure for other users.

Also suppose that the following three users have profiles stored in repository 204:

Heidi is interested in cameras, only clicks on advertisements about once a month, and has a general quality level of 6. Heidi's quality level specific with respect to goods advertised by Advertiser 1 (e.g., shoes) is 4; with respect to goods advertised by Advertiser 2 (e.g., gourmet foods) is 3; and goods advertised by Advertiser 3 (e.g., cameras) is 8.

Igor has a Google Checkout account and is known to have used it three months ago. He is interested in cars and clicks on between 1-3 advertisements a day, except for Sundays, when he is never active. His general quality level is 7 and his quality level for all types of advertisements except car-related advertisements is 6, while it is 9 for advertisements relating to cars.

A record for Jack was created in repository 204 five days ago and he has a general quality level of 4. No additional information is available.

The following is an example outcome, using embodiments of the tiered bidding techniques described herein.

The first advertiser is willing to pay $0.50 for a click from Heidi, given Heidi's general quality level of 6. (The first advertiser is only interested in users' general quality levels, and not with respect to particular classifications. Accordingly, the first advertiser ignores Heidi's level-4 quality assessment with respect to its advertisement class). The first advertiser is willing to pay $0.50 for a click from Igor, too, given his level-7 quality measure. The first advertiser is not interested in Jack, as his general quality level is below 5.

The second advertiser is willing to pay up to $0.15 for a click from Heidi (given her level-3 quality relative to the second advertiser's classification). The second advertiser is willing to pay $0.30+0.05 for Igor, where the $0.30 is for his advertiser-specific quality of 6, and where the extra $0.05 corresponds to the second user having a Google Checkout account. Finally, the second advertiser is willing to pay up to $0.20 for Jack's click.

The third advertiser is not interested in traffic from Heidi or Igor, since neither has clicked on an advertisement in the required time period, and therefore, the quality assessments and other profile aspects do not satisfy its requirements. The third advertiser is willing to pay $0.04 for a click from Jack, since Jack's quality level is 4.

Now suppose that an auction is commenced by auction engine 206 in accordance with the advertiser rules specified above (managed by policy unit 208) and the user profile information described above (stored in repository 204). The first advertiser has the highest bid for Heidi ($0.50); it also has the highest bid for Igor ($0.50). The second advertiser has the highest bid for Jack ($0.20). Given a traditional second-price auction, the charges for the three clicks will be $0.15 for Heidi (an auction won by the first advertiser); $0.35 for Igor (also won by the first advertiser); and $0.04 for Jack (an auction won by the second advertiser).

Examples 1 and 2 involve a small number of advertisers and users. Platform 102 is not limited to performing auctions of such scope. Further, while Example 2 considers quality measures with a few dimensions (i.e., corresponding to the general quality measures and the quality measures of the types of the various niches of the bidding advertisers) and for a small number of properties (such as historical clicking patterns and known ownerships of payment methods), the techniques described herein are not so limited. Specifically, auctions can use much more complex types of quality measures and can have many more dimensions.

Figure 4:
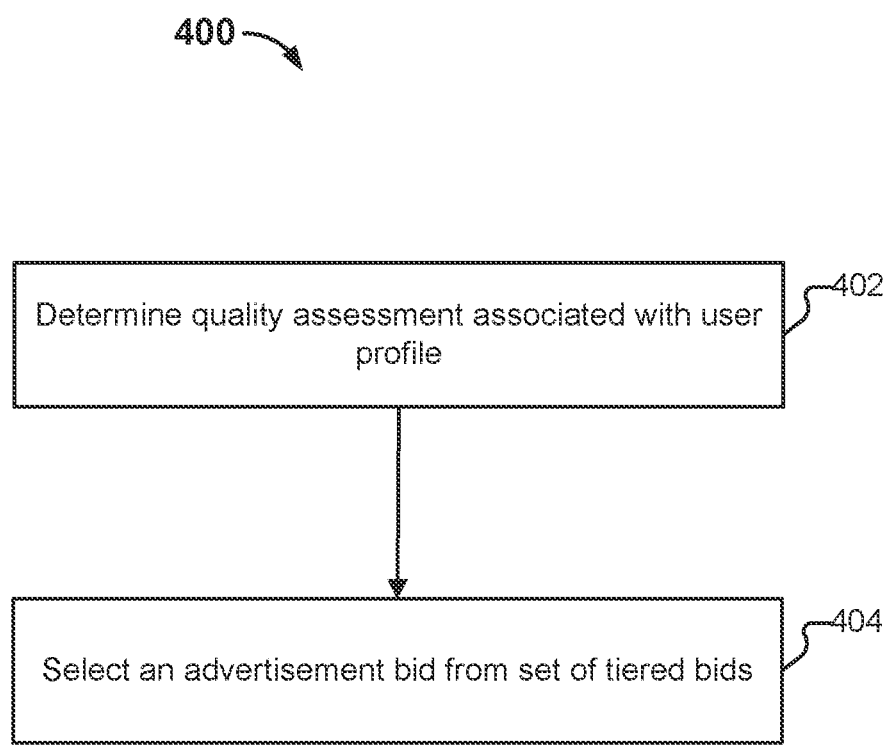
FIG. 4 illustrates an embodiment of a process for selecting an advertisement.

FIG. 4 illustrates an embodiment of a process for selecting an advertisement. In some embodiments, process 400 is performed by platform 102. The process begins at 402 when one or more quality metrics associated with a user profile are determined. As one example, the processing performed at 402 is initiated as part of a nightly cron job during which user profile data is refreshed (if applicable) and new quality metrics are determined (if applicable). In some embodiments, all quality metrics are determined as part of a batch process. In other embodiments, at least some quality metrics are determined in real time (e.g., in response to a request that an advertisement be shown to a user associated with the user profile). One example of a quality metric is a conversion assessment (e.g., indicating how likely it is that a given individual will click on an advertisement). Other quality metrics can also be determined, and composite metrics (i.e., combining multiple scores) can also be determined at 402.

The process ends at 404, when an advertisement bid is selected from a plurality of tiered bids based at least in part on the determined quality metric(s). An example of the processing performed at 404 is described above in conjunction with Example 2.

Click Filters

In various embodiments, click filters are used in conjunction with techniques for assessing quality measures. For example, in a first embodiment, several instantiations of each filter are used, each with different parameters. For example, if a given filter is used to determine whether a user has clicked too many times in a window of time, the number of clicks and the size of the window are both examples of such parameters. Different instances of the click filter are configured with different parameters, and the collection of outputs from the set of instances of the filter is used to compute a quality measure. This does not need to be a linear function. For example, it could be determined that a user with a moderate amount of activity in a reasonably large window has a higher quality measure than another user with much less or much more activity in the same window of time. Namely, the inactive user could be considered unlikely to transact while the very active user could be considered a risk, as very high activity could correspond to a user (or a bot) that is not likely to transact at all, but which is merely accessing a lot of information. Similarly, other collections of instantiations of other filters can be used in parallel, together creating a large array of binary or scalar outputs, the collection of which can be input to a function that generates the quality measure. This function can be rule-based, anomaly-based, based on machine-learning techniques, or a combination of these.

A second embodiment instead uses third-party click scoring filters that generate a score for a particular click. These scores can be normalized to produce a quality measure.

A third embodiment uses special-purpose filters that assess the likelihood of conversion (or other revenue event) given information about the click and the actions taken by the user after the click; this filter can be configured based on information received from third-party vendors, or inferred from the continued or ceased interest of the user in the topic (which is a proxy for the conversion or purchase information in the sense that it can be used to infer what the user did after the click). This special-purpose filter can incorporate historical behavior and actions of the user, as well as behavior and actions of the user taking place after a given click. It can also be used to assess the likely future behavior and actions of the user, given a particular future click. As one example, the special-purpose filter can infer that a purchase is likely to have taken place if a conversion was observed after some time of user interest in a topic, followed by little or no interest by the same user in the same or related topics. Similarly, the special-purpose filter can also infer that a purchase took place out of band, should the user express significant interest for some topic, followed by a lack of such interest. Furthermore, the special-purpose filter can infer that a purchase took place if the user expresses interest for related products or services that are commonly used in combination with the product or service under consideration only. The purchase did not take place if the user expresses interest in products or services typically used with alternative products or services. An example of the latter would be interest in a lens for a first brand of camera, after an initial interest in purchasing a second brand of camera. The interest in the lens suggests that the second brand of camera was not purchased. This, in turn, can be used to determine the likely past actions of said user and a profile useful to infer likely future actions of the user. This inference constitutes a special-purpose filter that can be used to generate a quality measure for the user in the context of one or more particular advertisements—such as an advertisement for a camera lens of a particular type.

A fourth embodiment uses a combination of click filters, click scoring filters, and special-purpose filters to generate a score for a particular click.

In the various click filtering embodiments described above, the click can be hypothetical—specifically, the filters can use the information known about the user, along with contextual information as if the click were to take place. This allows the generation of a quality measure before a click has taken place, and indeed, before even the end user has the opportunity to perform the click. The generation of the click measure can be performed without having displayed the advertisement or associated information, and be a measure of what the click filters and the scoring filters would have generated—or would be believed to have generated—on the click, were this to take place. To the extent that not all inputs to the filters would be known before the click actually takes place, such inputs can be approximated, guessed, set according to statistical likelihood estimates, or in accordance with any other appropriate rule. In some embodiments, the outputs for an entire collection of possible inputs of a type are generated, creating a collection of quality measures for the associated user and hypothetical click. The collection (or their estimated distribution) can be used to create a large vector of quality measures, which can be used as input to auction algorithms, or used to compute discounts or surcharges.

After a click has taken place, a second quality measure can be computed, where this second quality uses the actual input associated with the click, as opposed to the estimated input(s). This allows a first decision to be made using one or more quality measures for one or more users, for known and estimated inputs, and then a second decision using one or more quality measures of one or more users, for known and observed inputs. The first decision can be used as an input to the auction, or to a filter determining what advertisers would be selected to participate in a given auction; whereas the second decision can be used for billing purposes (e.g., to compute the actual charges to be made, where these may involve surcharges or discounts). In an alternative embodiment, the billing decisions can be made using both the first and second decisions, e.g., the charges may be the lowest charges estimated for the two phases corresponding to the two decisions, the average, or any other function of these.

Personae Identification/Management

In some cases, a device may have multiple users and/or a single user may use the device in two very distinct ways. As an example of the former, tablet 110 is used by two distinct individuals, Bob and Charlie. As an example of the latter, a single, specific individual may exhibit behaviors that appear as if two (or more) different individuals are sharing a device (e.g., where Alice uses her phone 108 at work very sparingly and only for business purposes vs. when she uses it at home for leisurely activities). In another example, a user may sometimes be properly identified using information communicated by his device, but at other times, only partially identified. For example, when an HTML cookie stored by a device is erased, the device may not be properly identified, and platform 102 would only know its associated user agent and geolocation information (the latter which is derived from the IP address of the device).

In some cases, platform 102 may be able to readily identify which of a set of potential users the current user is and make use of that user's profile information. As one example, Bob and Charlie might have two different accounts on device 110 and each account may have its own cookies that could be used to distinguish which of Bob and Charlie is currently using device 110 (e.g., to access site 126). In the case of a single user with multiple ways of behaving, in some embodiments profiles associated with both Alice's "work" behavior and "home" behavior are separately stored, and treated independently by platform 102. In other embodiments, a single profile associated with Alice is stored by platform 102 and includes information about both of her ways of behaving. In yet more embodiments, Alice's distinct behaviors are preserved in two different profiles, but the profiles are linked to one another.

It may also be the case that the current user doesn't yet have a profile in repository 204; that ambiguity exists as to whether the current user of a device has a profile stored in repository 204; or there may be ambiguity over which among several options in repository 204 is the appropriate profile to use. As one example, when Bob turns on tablet 110 for the very first time after purchasing it, no user information associated with him is stored in repository 204. As he uses the device over the course of a few days, the information included in his user profile stored in repository 204 will become less sparse. A similar situation may occur when Charlie starts using Bob's tablet, as detailed information about Charlie will not yet be present in repository 204. In a more extreme case, terminal 112 is used by potentially hundreds of individuals (or more).

In some embodiments, where a current user of a device might be one of multiple individuals with profiles stored in repository 204, or might be a user having multiple profiles, a quality measure is assessed. The quality measure includes an estimate of the likelihood that the current device user matches a given profile. Contextual factors can be considered in conjunction with performing the estimation. For example, day of week (e.g., work day vs. weekend); time of day (e.g., 10 am vs. 8 pm); type of activity (e.g., browsing site 126 vs. shopping on site 120); search terms (e.g., "buy refrigerator" vs. "cheap textbooks"); type of advertisement being displayed; and a description of recent activity of the user, such as clicks, conversions, and purchases. As one example, suppose platform 102 determines that, on a Sunday night at 7 pm, there is an 80% chance that Bob is using tablet 110, and a 20% chance that Charlie is doing so. In some embodiments, platform 102 will pick the profile matching with the highest probability (in this case, Bob, at 80%).

Figure 5:
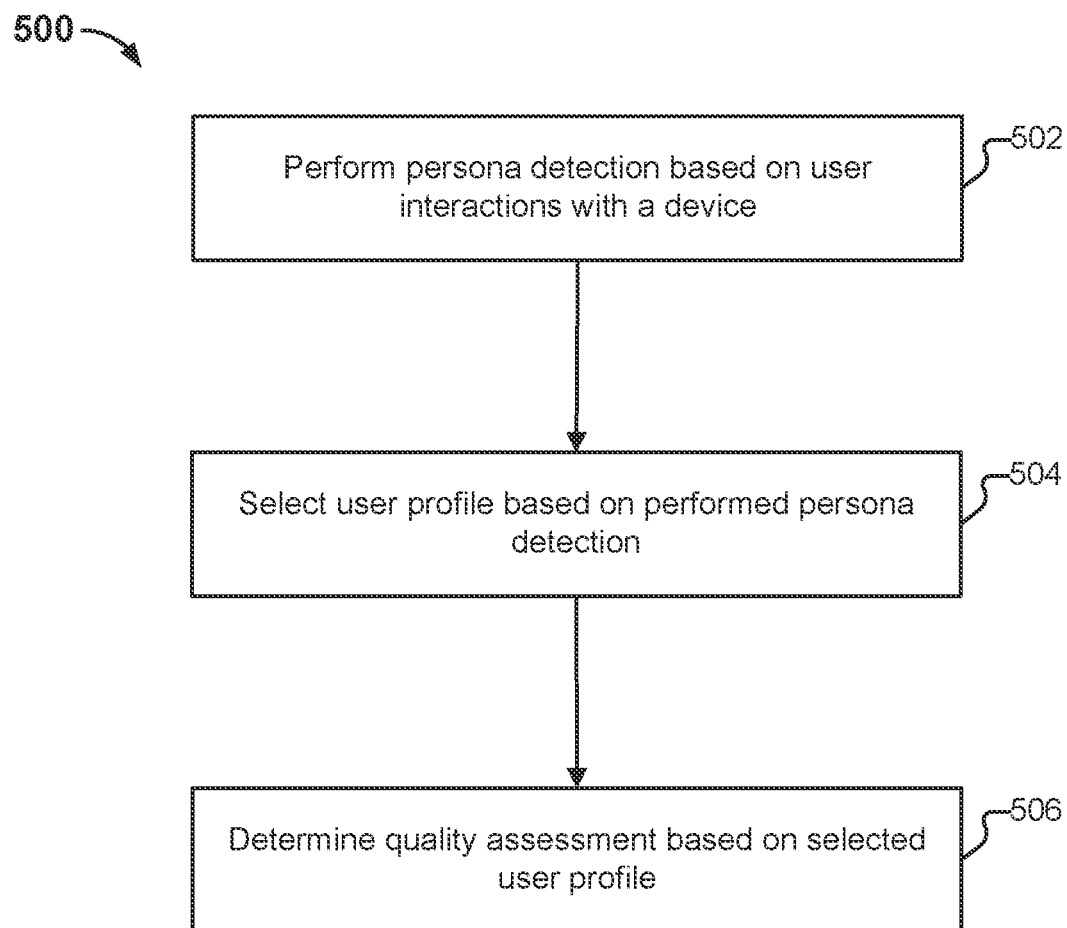
FIG. 5 illustrates an embodiment of a process for evaluating a user profile.

FIG. 5 illustrates an embodiment of a process for evaluating a user profile. In some embodiments, process 500 is performed by platform 102. The process begins at 502 when persona detection is performed based on user interactions with a device. A variety of techniques can be used to perform the detection. One example is described in conjunction with FIG. 6. At 504, a user profile is selected based on the persona detection performed at 502. The process ends at 506, when a quality assessment of the profile is determined. As one example, at 506, a conversion assessment can be performed with respect to the profile.

In some embodiments, any scores associated with Bob (e.g., his general quality score) will be reduced to reflect the degree of uncertainty by platform 102 regarding his identity. As one example, if Bob's general quality score is 5, on Sunday night at 7 pm, his score might be temporarily set to 4 for the remainder of the evening (as a result of multiplying 5 by 0.8). Aggregate information can also be used instead of or in addition to the use of likelihood estimates. For example, where it is ambiguous as to whether Bob or Charlie is using the tablet, in some embodiments, Bob and Charlie's information is composited together and new quality score information is determined for the composite. Additional information regarding personae management follows.

Figure 6:
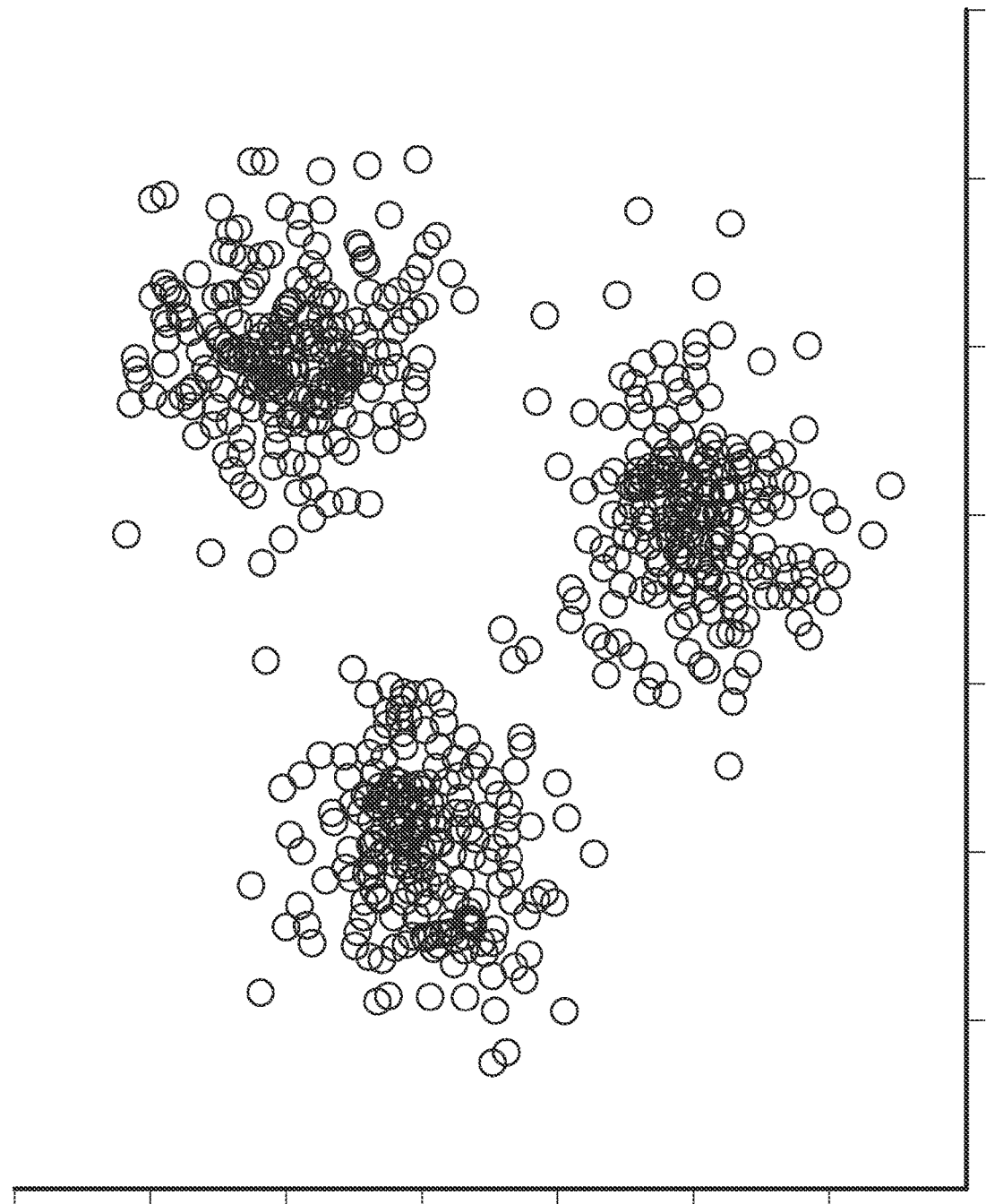
FIG. 6 illustrates a collection of measurements along two dimensions.

FIG. 6 illustrates a collection of measurements along two dimensions. On the x-axis is a measurement of the distance from the center of a display item that a user clicks, and on the y-axis is a measurement of the mouse-over speed leading up to the click. All of these example clicks correspond to a particular device (e.g., device 110), as identifiable by an HTML cookie, flash cookie, or other similar device ID feature. The measurements naturally form three clusters, which likely indicates that there are three distinct users of the device. On platform 102, the data in each of the three clusters is matched against previously stored data (or, if no matching data is found, new records are created). If matches are found, the profile information stored in repository 204 is updated as applicable. As the current user of the device continues to interact with the device, the profile stored in repository 204 can be refined and used to make quality assessments.

A variety of clustering techniques can be used to ascertain how many users a device has and what the users' characteristics are. In general, aspects are described as points in a multi-dimensional space. Some dimensions of this space are described by continuous variables, such as time, distance, and session click-through rate, whereas other dimensions are described by interest of different topics, search terms, and average time spent per page. A clustering of behavior can be performed for each device, where a device may correspond to multiple users, and each user may correspond to multiple personae. In some embodiments, associations are made to determine instances where one person is using multiple devices. For example, inferences can be made from IP address reuse, common co-location, similar behavior, etc.

When a client, such as client 108, accesses a resource for which platform 102 is configured to facilitate the serving of advertisements (or otherwise provide services), an attempt is made by platform 102 to locate one or more records in repository 204 that correspond to the most likely current user of the device. In one example, platform 102 knows the IP address and device user agent associated with an access, but has no additional information. For example, platform 102 knows from the IP address of the device that the access was made from Cupertino, and knows from the user agent that the accessing device was an iPhone on which Chrome is used to access the Internet. The user device does not have any cookie associated the site being accessed. Platform 102 locates a profile that corresponds to Cupertino-based iPhone users with Chrome. While this profile is likely to correspond to a vast number of users, it is still beneficial, as the aggregate user behavior for this profile is distinct from that of a profile corresponding to Chicago-based Nokia users, for example. Based on the identified profile, data describing the interests, conversion rate, and other related information is retrieved. Using this data, the most appropriate advertisement is selected among a list of potential advertisements. In one example, this selection is made in a manner that maximizes the anticipated revenue of the site as a result of the placement.

The user is shown the advertisement. In some embodiments, he is also sent identifiers, such as an HTML cookie and a cache cookie. A new profile is created with these identifiers included and with a reference to the profile that corresponds to the more generic Cupertino-based iPhone users with Chrome. It is observed whether the user interacts with the advertisement, and this information is associated with the new profile along with information about the advertisement, such as a tag describing the product being advertised. In addition, information is obtained that allows later identification of the user, such as the mean time on pages, the percentage of links that are clicked on, and more. As this user later returns and one of the identifiers, such as the HTML cookie, is detected, the profile is identified and information extracted, after which this information can be used to determine what advertisements are most appropriate to this user, and which ones are expected to maximize the revenue creation.

In another example, suppose a user visits a site able to extract a wealth of information about the interests of the user, such as site 120. The user's device is identified using various device ID technologies. In this example, suppose the user accesses the site using a Dell laptop with HTML cookies disabled. A flash cookie identifies the device, and the system identifies the profile(s) associated with this device. Suppose for purposes of this example that a total of two profiles are identified—one indicative of a person that acts in an impulsive manner and is associated with a high click-through rate but a very limited transaction volume, and one indicative of a person associated with a much more deliberate access pattern, fewer click-throughs, but a higher annual transaction volume, as measured in dollars. Usage patterns matching the first profile are observed to occur 10% of the time, and usage patterns matching the second profile are observed to occur 90% of the time, historically speaking. In some embodiments, the first and second profiles are linked together or combined, and statistical information regarding how frequently the respective profiles are matched is stored in repository 204. The first profile indicates that its user has an interest in cars and helicopters, and has a click-through rate of 60% for such advertisements. That user has been observed to spend $85 since the first observation, corresponding to an annual spending of $172. The second profile indicates that its user is interested in cooking, has a click-through rate of 10% for such advertisements, and has been observed to spend $701 since the first observation, corresponding to an annual spending of $910. Suppose one advertiser is willing to pay $0.50 for a click on a car advertisement by a user who is known to have performed online purchases. Another advertiser is interested in paying $0.10 for an impression to a user who has spent more than $100 on an annualized basis and with a click-through rate between 5-50%.

Suppose platform 102 does not know whether it is the user associated with the first profile or the user associated with the second profile who accesses the site. Platform 102 determines that with 10% probability, it is the user associated with the first profile. The platform determines that if the user is indeed the one associated with the first profile, the profit associated with displaying the car advertisement will be $0.50, should the user click, which happens with 60% probability. The expected benefit is therefore 0.10*$0.50*0.60=$0.03. If the platform instead determines that the current user is the one associated with the second profile, the profit will be $0.10 for serving an impression. Discounting In some embodiments, a site, such as search engine 126 (and/or platform 102), has an agreement with its impression advertisers that it will do a post-mortem discounting of advertisements if it determined later in the same session that an incorrect decision was made pertaining to the identity of the device user (i.e., that a user having a lesser quality score in the context of the displayed advertisement was used). The agreement is that this will result in a 50% discount. Re-using the previous example, there will be a $0.05 discount with a 10% probability if the advertisement slot is sold to the second advertiser, making the expected profit $0.03 for the car advertisement and $0.095 expected profit for the cooking advertisement. Platform 102 elects to display the cooking advertisement to the user. When the site 126 later confirms from the interaction with the user that there is support that the user corresponds to the second profile—e.g., by the user clicking on the cooking advertisement—the information is added to the records associated with the second profile. For sessions where the identity of the user cannot be resolved, the observed behavioral information is associated with a profile that corresponds to the device as such, with the expectation of later being able to perform a clustering that determines what persona the interaction corresponded to. This may lead to the creation of a third profile associated with the device, which may be a third person or one of the previous users in a different context, such as the person's at-work behavior.

In another embodiment, auctions for advertisements are not based on quality assessments. Instead, platform 102 applies a discount to each placement based on the assessed quality level. Here, this level may be assessed after the placement, such as at the end of a billing cycle, and may be a function of actions and observations made up until the assessment, and may be weighed to increase the relevance of actions taking place close in time to the placement, under similar contexts as the placement, or using other policies agreed on by the system and the advertisers. Using after-the-fact discounting is particularly useful in contexts where little is known about the user performing the visit at the time of the placement. Discounts can also be computed and applied at other times, and do not have to be computed at the end of billing cycles. For example, if a user is found to have a quality level of 8 out of 10 at the time discounts are applied, and an advertiser bids $0.10 for an impression to be displayed to this user, then the system may discount the impression by 20% (or 2 out of 10). Another user is found to have a quality level of 1 out of 10 in the context of a given CPC advertisement, for which an advertiser paid $0.20. The user clicked on the ad, causing a revenue generation event corresponding to $0.20. This is later discounted by 90%.

In various embodiments, only some advertisers qualify for discounts, e.g., volume advertisers, advertisers associated with some types of products, or advertisers in under-served pricing segments. Different discount levels can be applied in different contexts and using different rules and functions.

In various embodiments, any discount is also applied to the charges paid by platform 102 to any service provider in charge of displaying advertisements. The discounting of those corresponding payments may follow different formulae than those applied to the advertiser. For example, a site owner may be paid at three levels—$0.05 per click; $0.01 per click; or $0.25 per click, based on the quality levels observed, but independent of the discounts given to the advertiser. The higher payment may be reserved for a display leading to an action such as a purchase, whereas the lowest to an impression, and the middle to a click.

In various embodiments, quality assessments are used both to create a tiered bidding and to generate discounts at a later time. For example, discounts can be computed and applied when an assessment is made that changes the understanding of the quality level in place at the time of the placement; at a time after the placement was made; or applied to users where an insufficient amount of information is known, or where parts of the information was found to be incorrect.

Examples of Profile Records

In some embodiments, profiles are represented in repository 204 as one or more records. A variety of information can be included in the record, such as: (1) information regarding accesses by a user associated with the profile (e.g., whenever an advertisement is to be served to the user), (2) Device ID information where available, (3) IP information, (4) behavioral information, and (5) revenue generation information. Other information is also included or referenced, such as: (1) information regarding quality level, and (2) demographic information. The demographic information can include a variety of descriptors, such as (1) gender and age information or estimates of the same; (2) location information; and (3) information about interests.

FIG. 7 depicts an example of a profile record. The record references two device records. The first, #662888, contains an HTML cookie, a user agent, and a flash cookie identifier. The user agent identifies the device as a Dell computer running Internet Explorer 7.1, and contains a list of plugins and fonts selected by the user, among other things. Device record #99908 contains another HMTL cookie, a user agent, a cash cookie, and an identifier similar to a UDID. The user agent shows that this is an iPhone 3 running Chrome and on a Pacific time zone.

The record also points to access history record #1122001, which contains a long list of IP addresses and the number of accesses for each. It also shows the corresponding geolocations and contains a pointer to the more detailed IP data record #220975.

IP data record record #220975 contains a list of access records, each one indexed both by an IP address and a time of access. Along with each access record, there is also a pointer to a record describing the access, identifying the visited URL, the user action, and a link to a revenue event, if applicable.

Behavioral information record #608552 describes what types of interests the user has, including search terms, type of URLs visited, tags for advertisements, and whether the user clicked on these.

The set of quality levels contains pointers to tag descriptors, such as topic #551, which is "remote-control vehicles," and associated quality levels, such as 62% for topic #551 for the example record.

The demographic record describes the gender of the person and the probability that this estimate is believed to be correct. It also describes the estimated age, and the estimate of correctness probability. These estimates are based on previous observations relating to accesses, locations, times of accesses, terms searched for, and click-through behavior, among other things. The demographic record also contains pointers to geographic regions, and percentages of times that the user accesses the system from these areas. For example, this user accesses the system 22% of the time from zone31, which is San Francisco; 18% of the time from zone778, which is Palo Alto; and 7% of the time from zone3, which is the Chicago metropolitan area. The demographic record also describes the user's interests in terms of larger classes, one of which is "action" and which comprises a collection of more specific interests observed for this particular persona/user. Another profile might have a very similar structure, but correspond to a large collection of users. The larger profile would contain many more accesses, and contain a list of demographic information that is much longer, such as gender={(male 10-15 years, 8%), (male 16-20 years, 19%), (female 30-35 years, 12%)}. The demographic information now describes the probability distribution of the collection of accesses that this record describes. Similarly, the record describes a large collection of devices used to access the system, and the corresponding user agents, and more. In some embodiments, such a record is present in repository 204 and associated with client device 112.

Returning to FIG. 7, the trend information shown indicates that there are indications that the user associated with the persona in question is not interested in topic #110 due to some observations recorded in record #557781.

Each user record includes information regarding historical interests as well as recent interests. Together, these are used to determine when a need has been met. For example, a user with several historical searches, clicks and purchases relating to skydiving could reasonably be assumed to be interested in skydiving, and quite plausibly in other action-related activities. If the user suddenly stops making searches, clicks and purchases relating to skydiving, this does not with necessity mean that he is no longer interested in it. However, when he is starting searching for, clicking on, and making purchases indicating a new baby in the family, this—in combination with the absence of skydiving searches/clicks/purchases, is a reasonable indication that this user is not interested in skydiving, at least for the time being. It may still be relevant to pitch skydiving movies to this user, and skydiving books, but not skydiving equipment. However, when this user starts making searches for skydiving after some years, this is a very strong sign of renewed interest. This example also highlights the importance of identifying different personae, since otherwise there may be one skydiver and one recent parent who both use one device, but whose behavior does not influence each other.

Another example of where identifying trends is important is where a user first searches for a camera, lenses, and related merchandise; then searches for and accesses material describing how to use SLR cameras; and later purchases photo display material. This sequence of related interests strongly indicates that the user, after a while, must have purchased a camera already, which makes it less relevant for this person to view advertisements of cameras, but much more interesting to view ads from printing services.

Yet another example is of a user who accesses material relating to weddings and honeymoons, and then entirely stops being interested in such material. The complete lack of interest for these topics most likely either means that the user already got married (or has planned his or her wedding), or that he or she decided not to get married. The moment the users starts paying interest to material relating to mortgages, say, this may be an indication, in this context, that the user did get married. This signals the potential interest for any information relating to being newly married, buying a first home, and having a baby. However, if the user pays absolutely no interest to one or more of these topics, it is concluded that this is not of interest to the user at this point, but may become relevant later, statistically speaking. The system therefore makes observations about users and their likely life phases, likely interests, and likely lacks of interests. This helps better target material and also becomes a component in the quality level assessment for the user in the context of relevant advertisements.

This information is determined from changes in behavioral information, where one type of behavior is indicative of a temporary or permanent end of one or more other behaviors. When such an indication is observed, the system updates the corresponding personae records to indicate the current mode. The current mode may be a lack of interest for some product, or an intermediate stage where there is a probability value associated with the lack of interest for the product, and where this hypothesis is tested for some amount of time or for some number of events before the probability value is updated.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining a first quality score associated with a user profile, wherein the first quality score is based at least in part on an estimate of a likelihood of an event, wherein the first quality score is determined based at least in part on at least one of: (1) a first search associated with the user profile or (2) a first purchase associated with the user profile, and wherein the determining of the first quality score is based at least in part on a unique identifier comprising at least one of an HTML cookie, a cache cookie, or a user agent;
   determining, for a user associated with the user profile, an indication of interest in a first category, wherein the indication of interest in the first category is determined based at least in part on at least one of: (1) a second search associated with the user profile or (2) a second purchase associated with the user profile;
   storing, in a record associated with the user, the indication of interest in the first category, wherein the record comprises information that is at least partially anonymized;
   subsequent to determining the indication of interest in the first category, determining, for the user, that a need relative to the first category has been met based at least in part on at least one of: (1) a third search associated with the user profile or (2) a third purchase associated with the user profile;
   based at least in part on the determination that the need relative to the first category has been met, determining an indication of interest in a second category, wherein the indication of interest in the first category and the indication of interest in the second category comprise a sequence of related indications of interest;
   in response to determining that the need relative to the first category has been met, determining a second quality score associated with the user, wherein the second quality score is determined with respect to the second category;
   wherein at least one of the first quality score or the second quality score is based at least in part on a conversion assessment associated with the user profile, and wherein the conversion assessment is based at least in part on historical click behavior; and
   displaying an advertisement to the user based at least in part on at least one of the first quality score or the second quality score.

2. The method of claim 1, wherein at least one of the first quality score or the second quality score is based at least in part on an assessment of a purchase likelihood associated with the user profile.

3. The method of claim 2, wherein the purchase likelihood is determined relative to the advertisement.

4. The method of claim 1, wherein at least one of the first quality score or the second quality score is determined at least in part by using machine learning.

5. The method of claim 1, wherein at least one of the first quality score or the second quality score is determined with respect to the advertisement.

6. The method of claim 1, wherein at least one of the first quality score or the second quality score is used to determine at least one of a discount or a surcharge.

7. The method of claim 1, wherein the event comprises a conversion.

8. The method of claim 1, wherein the event comprises a purchase.

9. A system, comprising:
   one or more processors configured to:
      determine a first quality score associated with a user profile, wherein the first quality score is based at least in part on an estimate of a likelihood of an event, wherein the first quality score is determined based at least in part on at least one of: (1) a first search associated with the user profile or (2) a first purchase associated with the user profile, and wherein the determining of the first quality score is based at least in part on a unique identifier comprising at least one of an HTML cookie, a cache cookie, or a user agent;

determine, for a user associated with the user profile, an indication of interest in a first category, wherein the indication of interest in the first category is determined based at least in part on at least one of: (1) a second search associated with the user profile or (2) a second purchase associated with the user profile;

store, in a record associated with the user, the indication of interest in the first category, wherein the record comprises information that is at least partially anonymized;

subsequent to determining the indication of interest in the first category, determine, for the user, that a need relative to the first category has been met based at least in part on at least one of: (1) a third search associated with the user profile or (2) a third purchase associated with the user profile;

based at least in part on the determination that the need relative to the first category has been met, determine an indication of interest in a second category, wherein the indication of interest in the first category and the indication of interest in the second category comprise a sequence of related indications of interest;

in response to determining that the need relative to the first category has been met, determine a second quality score associated with the user, wherein the second quality score is determined with respect to the second category;

wherein at least one of the first quality score or the second quality score is based at least in part on a conversion assessment associated with the user profile, and wherein the conversion assessment is based at least in part on historical click behavior; and display an advertisement to the user based at least in part on at least one of the first quality score or the second quality score; and a memory coupled to the processor and configured to provide the one or more processors with instructions.

10. The system of claim 9, wherein at least one of the first quality score or the second quality score is based at least in part on an assessment of a purchase likelihood associated with the user profile.

11. The system of claim 10, wherein the purchase likelihood is determined relative to the advertisement.

12. The system of claim 9, wherein at least one of the first quality score or the second quality score is determined at least in part by using machine learning.

13. The system of claim 9, wherein at least one of the first quality score or the second quality score is determined with respect to the advertisement.

14. The system of claim 9, wherein at least one of the first quality score or the second quality score is used to determine at least one of a discount or a surcharge.

15. The system of claim 9, wherein the event comprises a conversion.

16. The system of claim 9, wherein the event comprises a purchase.

17. A computer program product embodied in a non-transitory computer readable storage medium and comprising computer instructions for:

determining a first quality score associated with a user profile, wherein the first quality score is based at least in part on an estimate of a likelihood of an event, wherein the first quality score is determined based at least in part on at least one of: (1) a first search associated with the user profile or (2) a first purchase associated with the user profile, and wherein the determining of the first quality score is based at least in part on a unique identifier comprising at least one of an HTML cookie, a cache cookie, or a user agent;

determining, for a user associated with the user profile, an indication of interest in a first category, wherein the indication of interest in the first category is determined based at least in part on at least one of: (1) a second search associated with the user profile or (2) a second purchase associated with the user profile;

storing, in a record associated with the user, the indication of interest in the first category, wherein the record comprises information that is at least partially anonymized;

subsequent to determining the indication of interest in the first category, determining, for the user, that a need relative to the first category has been met based at least in part on at least one of: (1) a third search associated with the user profile or (2) a third purchase associated with the user profile;

based at least in part on the determination that the need relative to the first category has been met, determining an indication of interest in a second category, wherein the indication of interest in the first category and the indication of interest in the second category comprise a sequence of related indications of interest;

in response to determining that the need relative to the first category has been met, determining a second quality score associated with the user, wherein the second quality score is determined with respect to the second category;

wherein at least one of the first quality score or the second quality score is based at least in part on a conversion assessment associated with the user profile, and wherein the conversion assessment is based at least in part on historical click behavior; and displaying an advertisement to the user based at least in part on at least one of the first quality score or the second quality score.

* * * * *